(12) United States Patent
Peytavy et al.

(10) Patent No.: US 7,791,898 B2
(45) Date of Patent: Sep. 7, 2010

(54) SECURITY APPARATUS

(75) Inventors: Alain Peytavy, Aix-en-Provence (FR); Alexandre Croguennec, Aix-en-Provence (FR)

(73) Assignee: Atmel Corporation, San Jose, CA (US)

( * ) Notice: Subject to any disclaimer, the term of this patent is extended or adjusted under 35 U.S.C. 154(b) by 979 days.

(21) Appl. No.: 11/256,124

(22) Filed: Oct. 21, 2005

(65) Prior Publication Data

US 2007/0018334 A1 Jan. 25, 2007

(30) Foreign Application Priority Data

Jul. 21, 2005 (FR) .................................. 05 07766

(51) Int. Cl.
*H05K 1/11* (2006.01)
*H05K 1/14* (2006.01)

(52) U.S. Cl. ........................ 361/792; 361/794; 361/795; 361/818

(58) Field of Classification Search ......... 174/259–262; 361/792–795
See application file for complete search history.

(56) References Cited

U.S. PATENT DOCUMENTS

| | | | | |
|---|---|---|---|---|
| 4,593,384 | A | 6/1986 | Kleijne | 365/228 |
| 4,691,350 | A | 9/1987 | Kleijne et al. | 380/3 |
| 4,783,801 | A | 11/1988 | Kaule | 380/3 |
| 4,807,284 | A | 2/1989 | Kleijne | 380/3 |
| 4,860,351 | A | 8/1989 | Weingart | 380/3 |
| 4,933,898 | A | 6/1990 | Gilberg et al. | 365/53 |
| 5,291,062 | A * | 3/1994 | Higgins, III | 257/698 |
| 5,406,630 | A | 4/1995 | Piosenka et al. | 380/52 |
| 5,557,502 | A * | 9/1996 | Banerjee et al. | 361/712 |
| 5,639,696 | A | 6/1997 | Liang et al. | |
| 6,396,400 | B1 | 5/2002 | Epstein, III et al. | 340/550 |
| 6,452,283 | B2 | 9/2002 | Smola et al. | 257/784 |
| 6,646,565 | B1 | 11/2003 | Fu et al. | 340/687 |
| 6,984,785 | B1 * | 1/2006 | Diao et al. | 174/535 |
| 7,209,362 | B2 * | 4/2007 | Bando | 361/761 |
| 7,245,505 | B2 * | 7/2007 | Kato et al. | 361/780 |
| 2005/0044403 | A1 | 2/2005 | Kim | |

FOREIGN PATENT DOCUMENTS

| | | |
|---|---|---|
| EP | 0860882 A2 | 8/1998 |
| WO | WO-98/18102 A1 | 4/1998 |

OTHER PUBLICATIONS

"International Application Serial No. PCT/US2006/024161 Examination Report mailed Jul. 17, 2008", 4 pages.

(Continued)

*Primary Examiner*—Tuan T Dinh
(74) *Attorney, Agent, or Firm*—Schwegman, Lundberg & Woessner, P.A.

(57) ABSTRACT

A method and device for data security including a printed circuit board and an integrated circuit each having a conductive trace layer shielded by a electrical shield layer. Tampering with either side of the device causes disturbance of a current flowing through a conductive trace layer used as an electrical shield. This triggers a security circuit to erase the data stored in the integrated circuit and stop data flow between the printed circuit board and the integrated circuit.

6 Claims, 5 Drawing Sheets

OTHER PUBLICATIONS

"Chinese Application Serial No. 200680032529.5, Response (with English translation) filed Nov. 18, 2009 to Office Action mailed Sep. 8, 2009", 8 pgs.

"Chinese Application Serial No. 200680032529.5, Office Action (with English translation) mailed Sep. 8, 2009", 6 pgs.

"French Application Serial No. 05/07766, Search Report and Written Opinion dated Apr. 25, 2006", 5 pgs.

"International Application Serial No. PCT/US06/24161, International Search Report mailed Aug. 15, 2007", 1 pg.

"International Application Serial No. PCT/US06/24161, Written Opinion mailed Aug. 15, 2007", 3 pgs.

"Chinese Application Serial No. 200680032529.5, Second Office Action mailed Feb. 5, 2010", (w/ English Translation), 7 pgs.

* cited by examiner

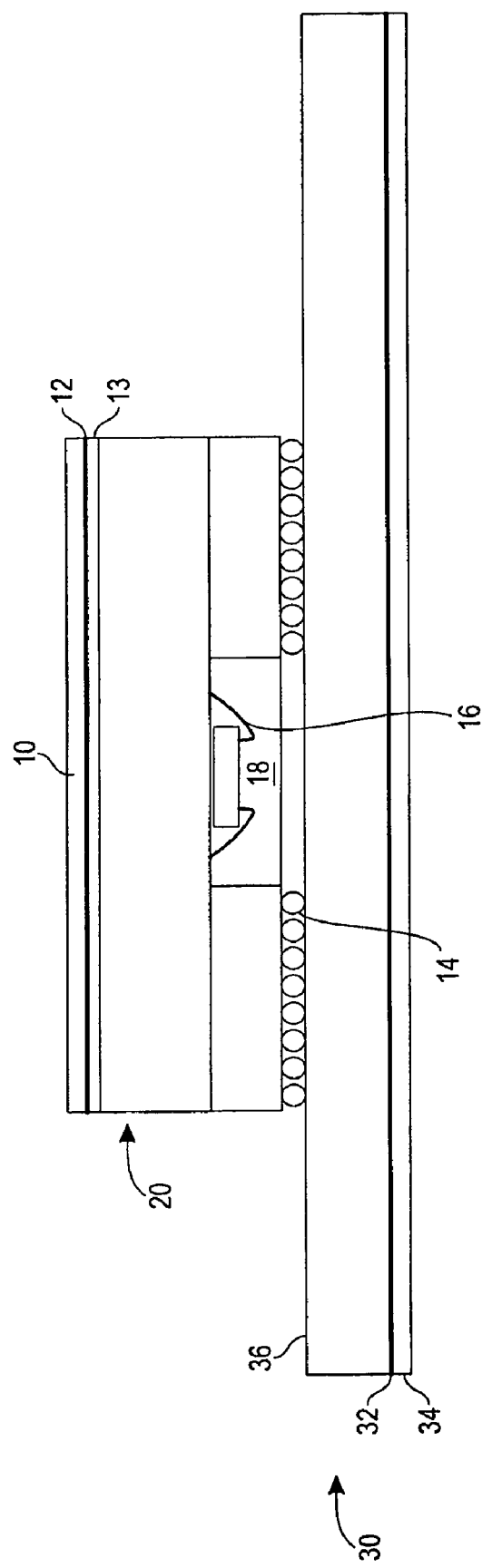

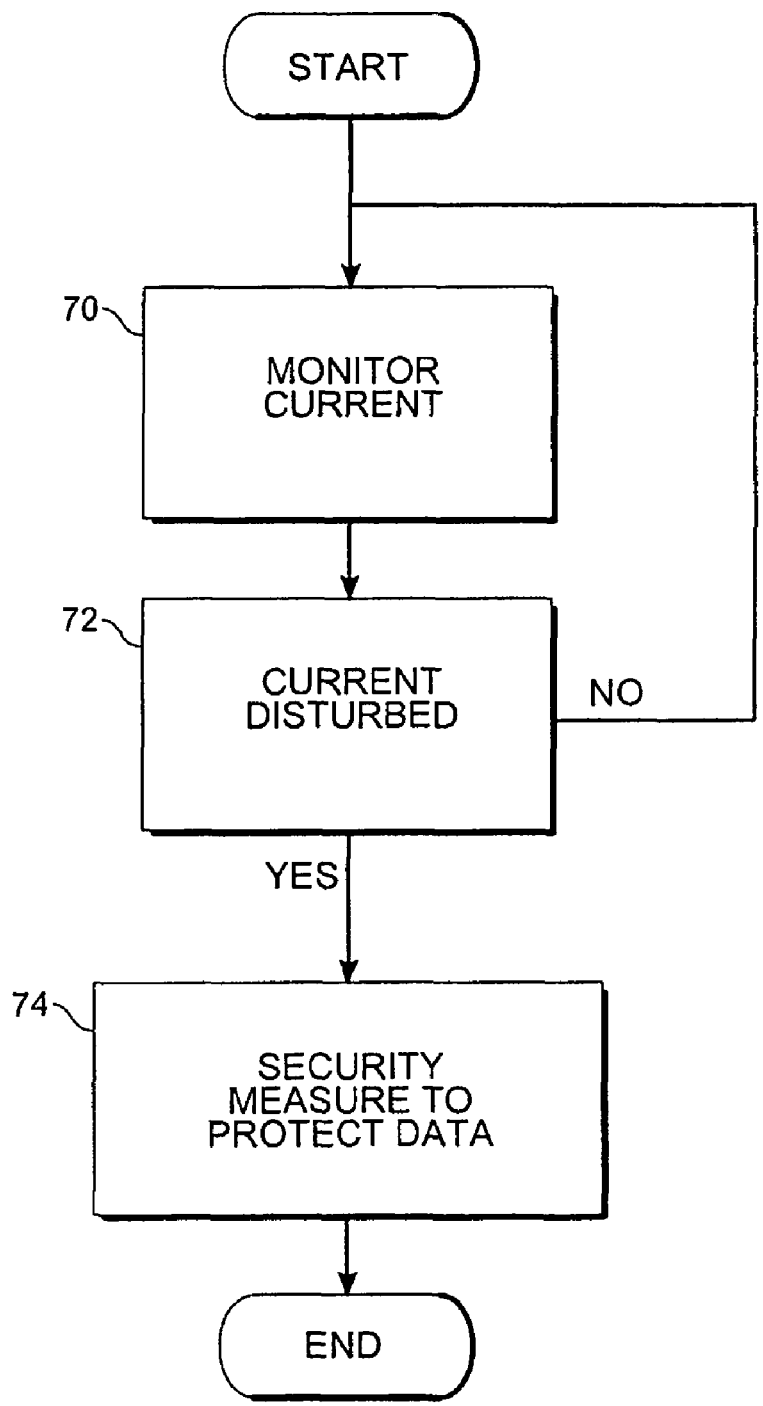
Fig._2

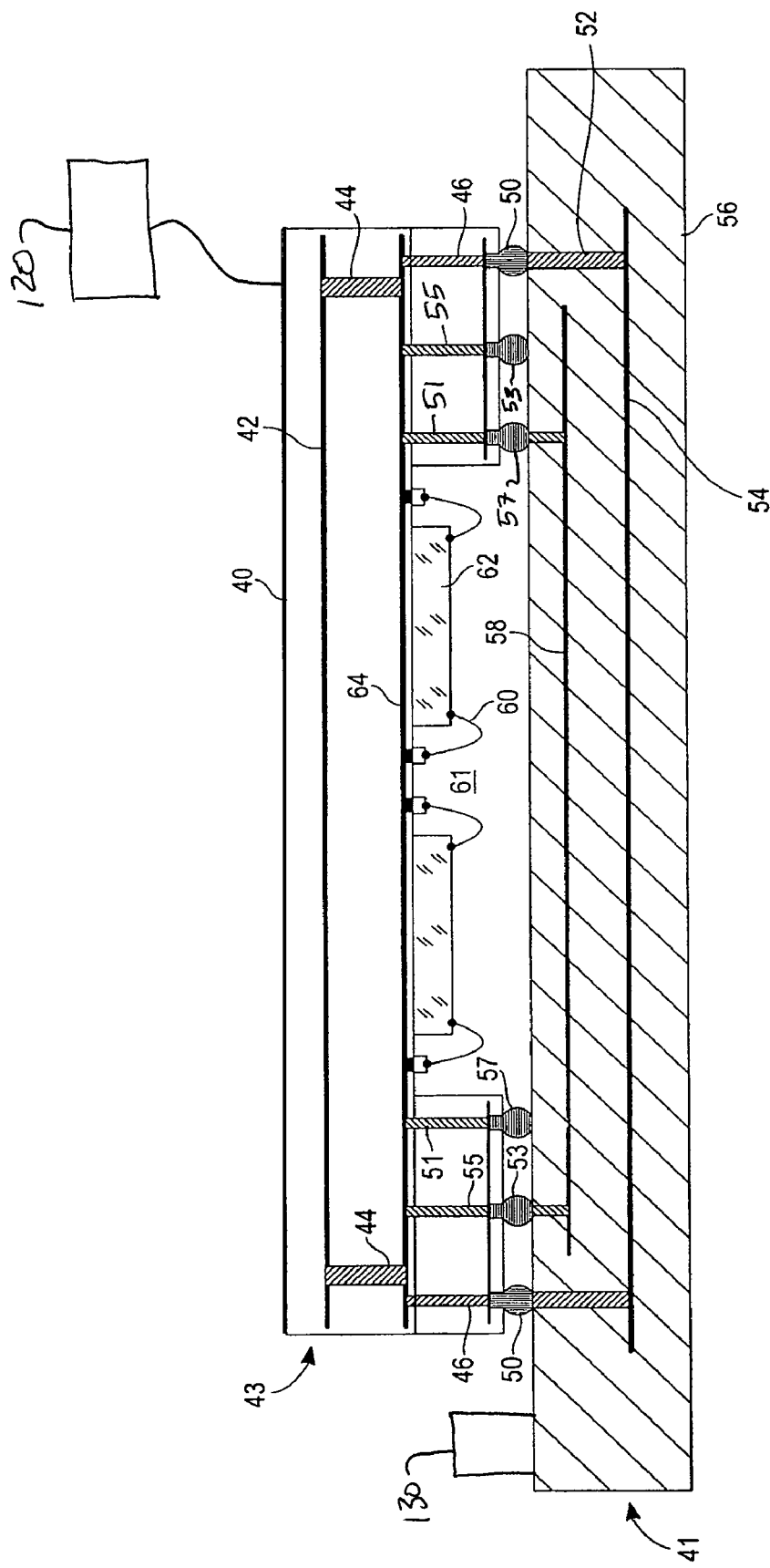
Fig._3

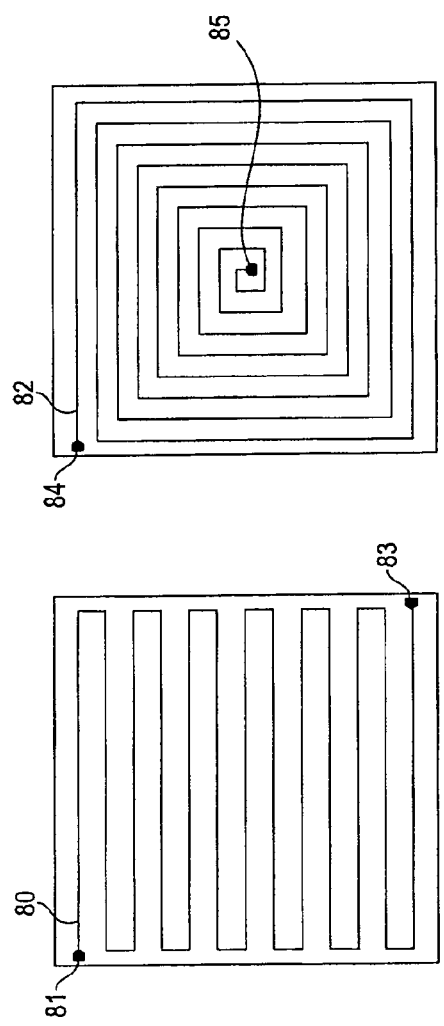
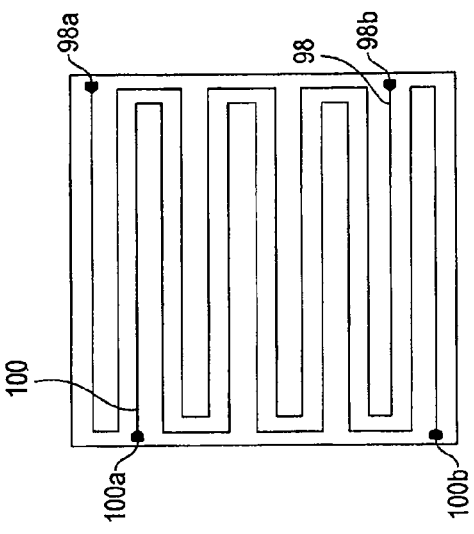
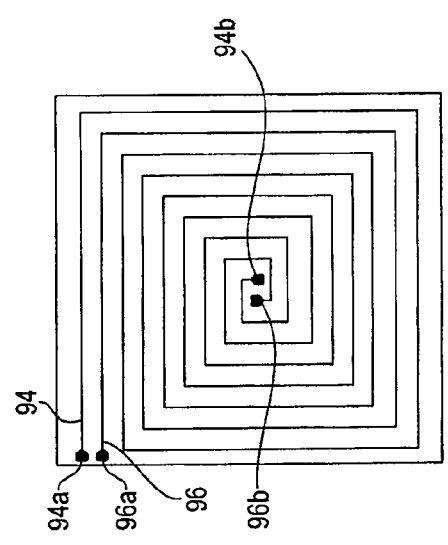
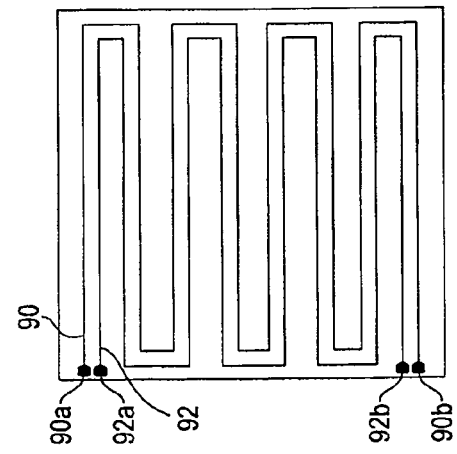

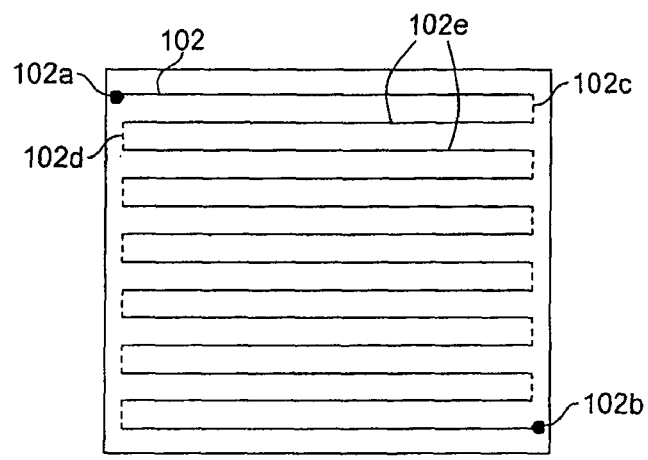
Fig._6
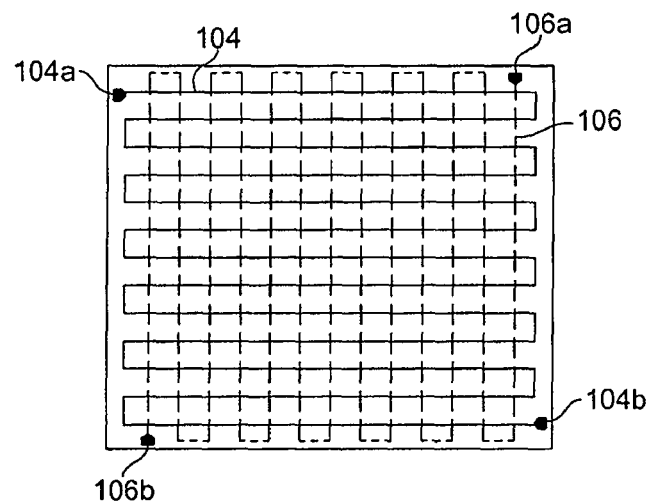
Fig._7a
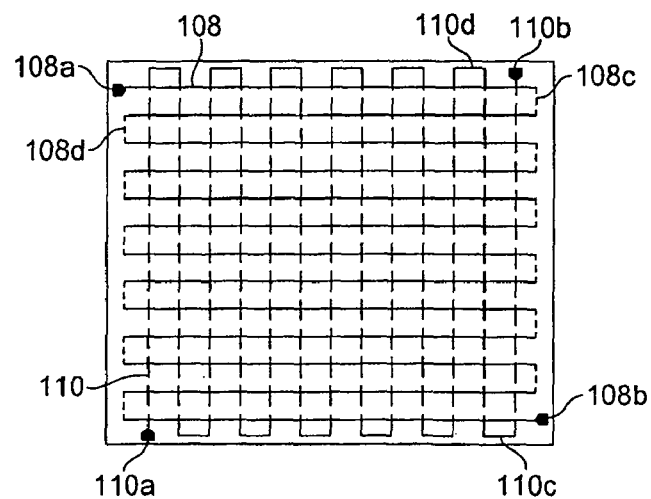
Fig._7b

SECURITY APPARATUS

TECHNICAL FIELD

The present device relates to data security devices and methods.

BACKGROUND ART

There presently is a need to provide security for data and software. For example, in bank terminals, data are entered using a touchpad or derived by a card reader (e.g., magnetic card reader). These data are used to make a secure transaction. Security is necessary for such a transaction and access to the data must be protected.

To ensure that the data are not tampered with, stolen, or otherwise accessed without authorization, the data are commonly encrypted prior to transmission. However data or software could still be accessed prior to encryption, as by accessing the leads of an integrated circuit to which the unencrypted data are first sent.

In prior devices a three dimensional mesh has been used to enclose a set of integrated circuits and prevent tampering. For example, U.S. Pat. No. 6,646,565 discloses a device for security of electronic circuits in which an electronic device is encased between a first and a second circuit board each of which has a serpentine conductive layer. A tamper detection circuit is connected to the conductive layer to detect circuit tampering. The entire device is wrapped in a mesh. Any tampering with the circuit boards or the mesh is sensed by detection of disturbance in a current flowing through a security layer in the circuit boards and mesh. This current disturbance signals a security system to erase sensitive data, such that it will not be intercepted. Other similar devices include U.S. Pat. Nos. 4,593,384; 4,691,350; and 4,807,284.

U.S. Pat. No. 5,406,630 discloses a tamper proof integrated circuit (IC) device. The package and lid include heavy metals to prevent both x-ray radiation and infrared detection of the functioning of the chip. This effectively provides an electrical shield of the workings of the IC.

U.S. Pat. No. 6,396,400 discloses a security system for protecting a data storage device. The data storage device is enclosed in a first housing, which is mounted within and separated from a second housing by a number of support structures. A vacuum is created in an interstitial space between the first housing and the second housing. Breach of the second housing causes a pressure change. The pressure change is detected by a sensor which signals the data storage device to act to protect the data from tampering.

These disclosed devices are complex and expensive. Alternative, simpler solutions are sought.

SUMMARY

A device and method to protect data using a cavity down pinless contact grid array on a printed circuit board. The grid array package must have an integrated circuit housing additional circuitry. The packaging of this integrated circuit includes a dielectic layer and a conductive layer beneath the dielectric layer. In a similar manner, the circuit board also includes a conductive layer used as an electrical shield layer. Both the printed circuit board and the cavity down grid array integrated circuit have a current introduced through the conductive layer on each respective device. If tampering is detected by a disturbance of the current, then the chip is instructed to scramble or erase data on the chip, preventing access.

BRIEF DESCRIPTION OF THE DRAWINGS

FIG. 1 is a cross section of an integrated circuit positioned on a printed circuit board.

FIG. 2 is a flow chart of an embodiment of the security process.

FIG. 3 is a cross sectional view of another embodiment showing an integrated circuit and a printed circuit board.

FIG. 4a is a top view of a serpentine trace having two ball contacts.

FIG. 4b is a top view of an alternative serpentine trace having two ball contacts.

FIG. 5a is a top view of a first embodiment of a two net serpentine trace, each net having two ball contacts.

FIG. 5b is a top view of a second embodiment of a two net serpentine trace, each net having two ball contacts.

FIG. 5c is a top view of a third embodiment of a two net serpentine trace, each net having two ball contacts.

FIG. 6 is a top view of a serpentine trace having two ball contacts in which the trace extends into two layers.

FIG. 7a is a top view of a first embodiment of a two net serpentine trace, each net having two ball contacts, with the nets occupying two layers.

FIG. 7b is a top view of a second embodiment of a two net serpentine trace, each net having two ball contacts, with the nets occupying two layers.

DETAILED DESCRIPTION

In the illustrated exemplary embodiment of FIG. 1, a secure integrated circuit has security protection such that it may be used for secure transactions. In this embodiment a cavity down ball grid array integrated circuit 20 is positioned on a printed circuit board 30. Integrated circuit 20 includes balls 14 on the ball grid array. The cavity 18 faces down towards the printed circuit board 30. A wire pin 16 within the cavity 18 is thus not accessible to tampering without drilling through the integrated circuit packaging or the circuit board.

The packaging of the integrated circuit includes an electrical shield layer 12. Layer 10 is a dielectric layer (such as black epoxy or similar material). Layer 10 protects the electrical shield from physical tampering without prior de-processing. Below this shield layer 12 is a conductor layer 13, for example a plated copper layer. Layer 13 is a conductive layer used for other signal routing. Layer 12 is made by a serpentine trace. This conductor layer 12 is connected to a monitoring circuit, a current source, and to the memory of the integrated circuit. If the integrated circuit is tampered with, as by drilling or other interference, the security circuit is triggered to erase the data on the integrated circuit 20. In a similar manner the printed circuit board 30 includes an dielectric layer 34. If the current is interrupted or otherwise tampered with, the security device erases the data such that it cannot be accessed.

In the illustrated example, a ball grid array integrated circuit was used. Other contact arrays, such as a column grid array may alternatively be used. It is preferred that the lead array not include pins (i.e., be a pinless array.) Pins extending into and/or through a printed circuit board would negate the ability to protect signal on the leads.

The integrated circuit that is put in a secure package is designed to embed a specific circuitry that will drive both the integrated circuit security layer 12 and the printed circuit board security layer 32. This circuitry checks to ensure that the integrity of the circuit has not been compromised or been subject to tampering.

In FIG. 2, the flow diagram of the security feature in operation is similar to the operation of prior devices in which a combination of multiple printed circuit boards and mesh polymer was used although the device of the present invention is significantly different from the prior art. During the continuous security operation at operation 70, the current flowing through the security system is monitored. The voltage detected at any given time may be compared to a known set voltage level to determine if the voltage is expected and consistent with past voltage levels. At operation 72 a logic queries whether the current has been disrupted. If not, the logic instructs a continuation of operation 70 where the security circuit is monitored. If operation 72 does detect tampering with the circuit (indicated by a disruption of the current), operation 74 is initiated, and a security measure is initiated to protect the data. Generally, this security measure will be to erase the data.

With respect to FIG. 3, a cross section of an alternative integrated circuit and circuit board is shown. This device includes integrated circuit 43 mounted on circuit board 41. Packaging 40 prevents physical examination of the underlying security shield. This material may be a black epoxy or other similar material.

Embedded in packaging 40 is integrated circuit security shield 42. This security shield may be any conductive means that may be monitored by a security circuit to allow detection of tampering. A serpentine trace is one security shield implementation. Attached to the outer edges of security shield 42 are conductive connections 44, which connects to layer 64, which in turn is connected to conductive element 46, which terminates at ball 50. Conductive elements 44, 46 and ball 50 of the ball grid array provide a continuous conductive side shield such that any physical tampering of the chip would be detectable by the security circuit. Conductive elements 44 and 46 are connected to layer 64 such that other signals may be sent on layer 64. These would include signals from device 62 sent via connections 60, signals from ball 57 sent via connection 51, and signals from ball 53 sent via connection 55.

Ball connectors 50 are connected to conductive element 52 on printed circuit board 41. This conductive element is connected to security shield layer 54 on the printed circuit board. The combination of conductive elements 44, 46 and ball 50 provide a continuous conductive barrier which protects against side invasion of the integrated circuit while conductive element 52 (to which ball 50 is conductively coupled) provides the same sort of barrier for the circuit board 41. Security shield 54 on printed circuit board 41 and electrical shield 42 on the integrated circuit 43 complete this security protection such that a security envelope is formed, protecting all sides with a conductive shield. Tampering with this shield would be detected by a security circuit, which could then take the appropriate action (e.g., erasing sensitive data on the chip and prevention of data transmission from the printed circuit board). Packaging 40 prevents physical inspection of both electrical shield 42 and the side conductive elements 44 and 46.

A number of elements within this security envelope could carry sensitive data. Ball 53 is connected to layer 58 on printed circuit board 41. Sensitive data could be carried on the circuit board at layer 58, transmitted though balls 53, carried on integrated circuit layer 64, and carried on device 62 or conductive connections 60. All elements contained in internal cavity 61 would be protected by the security envelope, as would be the internal elements within integrated circuit 43 and printed circuit board 41 within the security envelope. The same approach may be used with different integrated circuits and other elements (such as displays, keyboards) on the same printed circuit board.

The security shields may be produced having an number of different designs. For example, single layer, single net, two ball serpentine shield designs are shown in FIGS. 4a, 4b. In FIG. 4a, at the ends of trace 80 are vias 81, 83. In FIG. 4b, at the ends of trace 82 are vias 84, 85. In these two figures, the security shield forms a single layer until the location of vias 81, 83, 84, 85, where conductive elements extend to a via contact. The balls can be at a central location, at an edge location, or in some combination of locations. The conductive trace can have a spiral pattern or a pattern that makes regular sweeps back and forth as just two examples.

A number of single layer, two network shield designs are shown in FIGS. 5a, 5b, and 5c. In FIG. 5a, first net trace 90 includes two vias 90a, 90b, and a second net trace 92 terminates at vias 92a, 92b. In a similar manner, in FIG. 5b first net trace 94 has vias 94a, 94b, and second trace 96 terminates at vias 96a, 96b. For FIG. 5c, first trace 100 terminates at vias 100a, 100b at the ends of the trace and second trace 98 terminates at vias 98a, 98b. In all three of these examples, the length of the trace is on a single plane, while the vias are connected through a conductive path down the sides of the integrated circuit.

FIG. 6 illustrates a two layer, single net serpentine security device. Trace 102 terminates at vias 102a, 102b. A connection through a thickness of the packaging allows the serpentine trace to include sections 102c and 102d, which are in different layers (i.e., above or below) than the rest of the serpentine trace. FIGS. 7a, 7b illustrates two layer, two net serpentine security devices. In FIG. 7a, a first layer includes a first trace 104, which terminates at vias 104a, 104b. In a second layer a second trace 106 terminates at end vias 106a, 106b. The vias may extend via connectors to a surface location on the integrated circuit as shown in FIG. 3. In FIG. 7b, each of the traces are similar to the trace of FIG. 6. Trace 108 terminates at vias 108a, 108b. Sections 108c, 108d of trace 108 extend into a different layer than the layer containing the rest of trace 108. Trace 110 terminates at vias 110a, 110b. Sections 110c, 110d of trace 110 extend into the layer holding the longer sections of trace 108. Many other possible configurations for the electrical shield exist.

With reference to FIG. 3, when the integrated circuit 43 including the security shield of this invention is mounted on a printed circuit board 41, an external power supply 120 is provided to the chip. This allows sensitive data to be stored on the chip. The power also drives the security circuit, with the current through the security circuit being continually monitored. The integrated circuit 43 can receive sensitive communications and relate sensitive data to the circuit board 41. The storage of information on the integrated circuit 43 and the running of the security on the chip may be ensured by a supply battery 130 on the printed circuit board 41. A main supply may be used for power transfer of sensitive information from the integrated circuit 43 to the circuit board 41, and throughout the board 41.

What is claimed is:

1. A device comprising:
   a first electrical shield;
   a second electrical shield;
   an integrated circuit between the first electrical shield and the second electrical shield;
   electrically conductive elements coupled between the first electrical shield and the second electrical shield;
   a security circuit coupled to monitor current in the first electrical shield, the second electrical shield and the conductive elements;
   a circuit board comprising a first side, a second side and a first conductive layer;

an integrated circuit package comprising the integrated circuit and a second conductive layer; and wherein the conductive elements electrically connect the first conductive layer to the second conductive layer and electrically connect the second conductive layer to the first electrical shield.

2. The device of claim 1, wherein the conductive elements connect the second electrical shield to the first electrical shield via the second conductive layer.

3. The device of claim 1, wherein the circuit board further comprises a dielectric on the first side covering the first electrical shield.

4. The device of claim 1, wherein the integrated circuit package further comprises a dielectric covering the second electrical shield.

5. The device of claim 1, wherein the integrated circuit package is coupled to receive power from an external power supply.

6. The device of claim 2, wherein the conductive elements comprise vias in both the integrated circuit package and the circuit board at an outer periphery of the integrated circuit.

* * * * *